United States Patent [19]

Locker

[11] Patent Number: 4,583,415
[45] Date of Patent: Apr. 22, 1986

[54] FRICTION WHEEL TRANSMISSION FOR DRIVING A ROTARY SIEVE DEVICE

[75] Inventor: Jan A. K. Locker, Steenwijk, Netherlands

[73] Assignees: C.L.M. Cooperatieve; Machinefabriek A. Wijnveen B.V. Ede, both of Netherlands

[21] Appl. No.: 477,929

[22] Filed: Mar. 23, 1983

[30] Foreign Application Priority Data

Mar. 24, 1982 [NL] Netherlands .................. 8201230

[51] Int. Cl.$^4$ .................. F16H 13/00; F16H 13/10; F16H 13/02; B07B 1/42
[52] U.S. Cl. .................. 74/207; 74/209; 74/206; 74/397; 209/369
[58] Field of Search .......... 74/202, 206, 207, 208, 74/209, 397, 396, 395; 209/369, 364

[56] References Cited

U.S. PATENT DOCUMENTS

| | | | |
|---|---|---|---|
| 2,213,000 | 8/1940 | Fawick | 74/207 |
| 2,350,791 | 6/1944 | Mennesson | 74/207 |
| 3,100,746 | 8/1963 | Holowaty | 209/304 |
| 3,136,165 | 6/1964 | Pitts | 74/207 |
| 3,215,411 | 11/1965 | Pitts | 74/202 |
| 3,225,854 | 12/1965 | Goerner | 74/207 |
| 3,905,442 | 9/1975 | O'Neill, Jr. | 74/207 |
| 3,978,936 | 9/1976 | Schwartz | 74/207 |
| 4,048,788 | 9/1977 | Kamlukin et al. | 74/209 |

FOREIGN PATENT DOCUMENTS

| | | |
|---|---|---|
| 0027296 | 4/1981 | European Pat. Off. . |
| 0027297 | 4/1981 | European Pat. Off. . |
| 342450 | 4/1920 | Fed. Rep. of Germany . |
| 808516 | 7/1951 | Fed. Rep. of Germany . |
| 508560 | 10/1920 | France . |
| 781851 | 6/1935 | France . |
| 1355962 | 2/1964 | France . |
| 6712102 | 3/1968 | Netherlands . |
| 426533 | 4/1935 | United Kingdom . |

*Primary Examiner*—Leslie A. Braun
*Assistant Examiner*—Michael D. Bednarek
*Attorney, Agent, or Firm*—Andrus, Sceales, Starke & Sawall

[57] ABSTRACT

A device for driving a rotary sieve device, which device comprises at least one drive set that is connected through a transmission with one or more rotatable sieve surfaces which are placed in a housing.

The novelty is the pneumatic tire mounted on a wheel that is fastened to a bushing mounted on the outgoing shaft of the drive set. The running surface of the pneumatic tire contacts a drive surface on the outside of the housing, which is connected by means of a horizontal leg to a vertical ring fastened below the sieve surface.

This arrangement provides for the slippage and/or elastic deformation of the pneumatic tire in case of shocks or impact loads on the sieve surface by sudden amounts of material to be sieved through the sieve surfaces.

1 Claim, 1 Drawing Figure

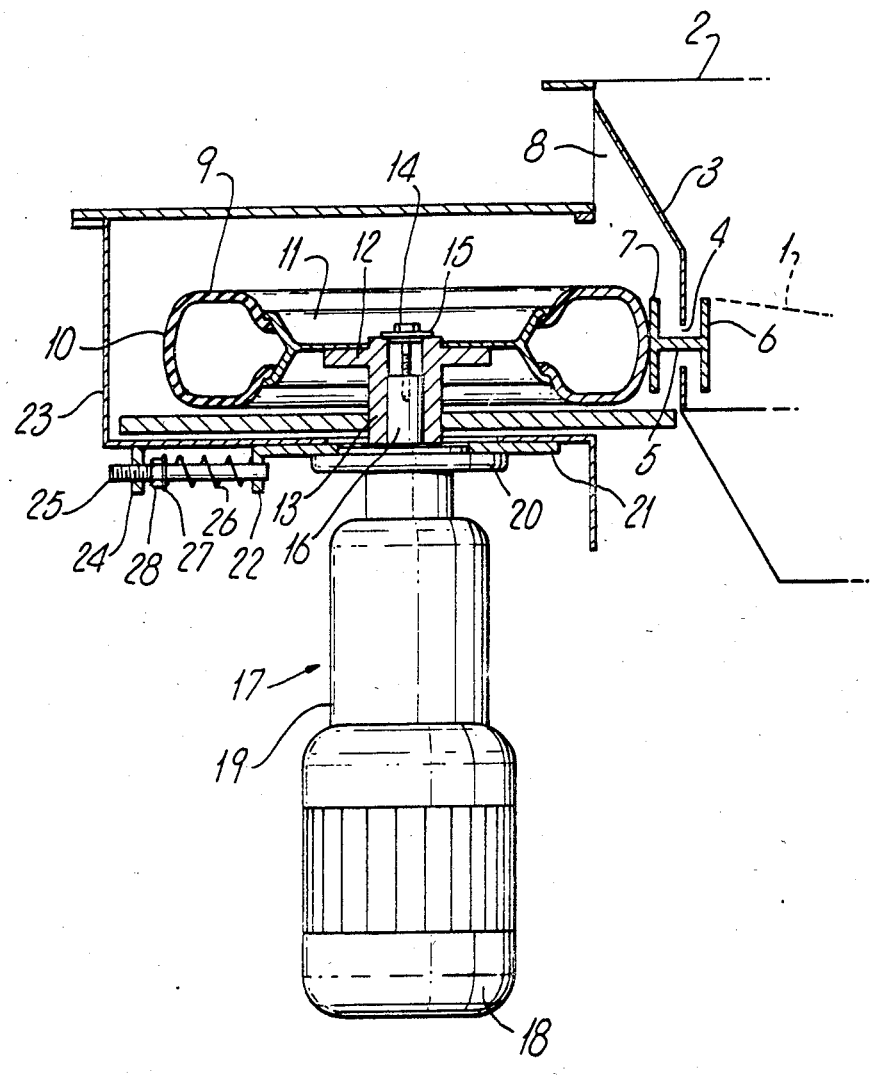

FRICTION WHEEL TRANSMISSION FOR DRIVING A ROTARY SIEVE DEVICE

The invention relates to a device for driving a rotary sieve device, comprising at least one drive set which is coupled through a transmission to one or more rotary sieve surfaces, which are arranged in a housing, in which the transmission comprises at least one friction wheel, of which the arming surface can be contacted with at least one ring shaped drive surface on the rotary sieve surfaces.

A device of this type is shown in GB-A-426.533. The friction transmission here comprises two wheels, of which the axes are perpendicular, whereas the transmission takes place through bevelled friction surfaces. The result thereof is that sudden or peak loads of the supply of material to be sifted causes shocks or impacts which can only be partly absorbed by slippage in the rigid friction transmission and are partly transferred to the drive set, in which they can cause fast wear. Also the accessibility is poor, so that renewal and maintenance are costly and complicated.

The object of the invention is providing a friction transmission between the drive set and the sieve surfaces, which absorbs shocks or impacts in a flexible way by slippage and elastic deformation, is simple, has low vertical structural dimensions and can be easily maintained or exchanged.

This object is reached by the invention in that the friction wheel carries a pneumatic tire.

By application of this pneumatic tire transmission a simple, inexpensive structure is obtained, which can easily be maintained and renewed respectively, without large disassembly and assembly activities being necessary. When shock or impact loads are encountered, these are absorbed flexibly by a larger or smaller slippage and elastic deformation of the running surface whithout transfer of these shock loads to the drive set. This pneumatic tire can also easily absorb variations in the regularity of roundness of the ring shaped drive surface.

According to a preferential embodiment of the invention the transmission is provided with an adjustable spring device with which the pneumatic tire is elastically pressed against the ring shaped drive surface. By this adjustable elastic force an optimal pressing force of the pneumatic tire against the drive surface is obtained, by which the contact of the pneumatic tire with the drive surface is maintained under all circumstances.

In yet another, advantageous embodiment of the invention the drive set is arranged separately from the housing of the sieve surfaces, in which the drive surface is accessible from the outside of the housing for the pneumatic tire of the transmission. This structure has the additional advantage, that the drive set with pneumatic tire is not placed below the housing of the device, but is freely accessible, whereby the assembly is easily accessible for maintenance and/or possible renewal.

The invention will now be further elucidated referring to the accompanying drawing of an embodiment showing a partial axial cross section.

In the drawing a part is shown of the circumference of the rotatable, upwardly inclined, cone shaped sieve surface 1, which is rotatable around a (not shown) vertical shaft in the housing 2. At the upper side of the sieve surface 1 there is supplied the (not shown) material to be sieved, of which the fine component falls through the sieve surface 1 and the coarse component is removed over the edge of the sieve surface. In order to protect the drive against this coarse component, the protection wall 3 is arranged outside the circumference of the sieve surface 1 at the location of the projecting box 23. This protection wall 3 has a passage opening 4 through which the horizontal leg 5 projects of the T-profile 6 extending around the circumference of the sieve surface 1. The ring shaped drive surface 7 is fastened to the horizontal leg 5, of which drive surface 7 the (imaginary) axis of rotation coincides with the axis of rotation of the sieve surface 1.

This ring shaped drive surface 7 is accessible for the pneumatic tire 7 through a niche 8 in the housing 2, of which pneumatic tire 9 the running surface 10 contacts the drive surface 7. The pneumatic tire 10 is fastened on the wheel 11, of which the hub 12 is fastened by means of a bushing 13 and a closing nut 14 with washer 15 on the outgoing shaft 16 of the drive set which is generally indicated with 17. This drive set comprises preferentially an electric motor 18 and a gear reduction box 19, which is fastened by means of a flange 20 and a number of (not shown) nuts and bolts to the sliding plate 21. This sliding plate 21 is slidable from and to the housing 2 in (not shown) guides and is provided at its side remote from the housing 2 with a vertical flange 22, whereas below the fixed part of the projecting box 23 for the drive, also a vertical flange 24 is fastened. Through these flanges 23 and 24 aligned threaded holes are made through which extends the screw bolt 25. Around this screw bolt 25 there is mounted a pressure spring 26, which is confined between the flange 22 and a pressure ring 27, which in its turn is pressured by an adjustment nut 28 which is displacable over the screw bolt 25. With this screw 28 it is possible to adjust the pressure, with which the pneumatic tire 9 is pressed against the ring shaped surface 7, whereas the slide plate 21 always stays elastically slidable in its (not shown) guides.

I claim:

1. A rotary sieve device having a friction transmission comprising:
   a housing (2, 3);
   a plurality of rotatable, substantially horizontal sieve surfaces (1) rotatable about a substantially vertical axis and arranged in said housing;
   a ring-shaped drive surface (7) connected to said rotatable sieve surfaces and arranged at the outside circumference (5, 6) thereof;
   a pneumatic tire (9) having a running surface (10) engaging said ring-shaped drive surface (7) for driving said rotatable sieve surfaces (1), the axis of rotation of said tire extending parallel to the axis of rotation of said drive surface;
   drive means (19) coupled to said pneumatic tire for rotating same; and
   mounting means for said drive means comprising a mounting plate (20) for said drive means, said mounting plate being fastened to a slide plate linearly movable on said housing (2, 3) toward and away from siad ring-shaped drive surface (7), said slide plate having a first depending flange (22), said housing having a second depending flange (24) opposing said first depending flange, a pressure spring (26) interposed between said flanges for biasing the running surface (10) of said pneumatic tire (9) into contact with said ring-shaped drive surface (7), and means (25, 27, 28) for adjusting the bias provided by said pressure spring.

* * * * *